United States Patent [19]

Infinger

[11] Patent Number: 5,490,345
[45] Date of Patent: Feb. 13, 1996

[54] SINKER APPARATUS FOR TEXAS RIG FISHING LURE

[76] Inventor: Charles E. Infinger, 629 E. Obispo Ave., Clewiston, Fla. 33440

[21] Appl. No.: 235,867

[22] Filed: May 2, 1994

[51] Int. Cl.⁶ .................... A01K 91/02; A01K 91/04
[52] U.S. Cl. .................. 43/42.39; 43/42.36; 43/42.24
[58] Field of Search .................. 43/42.39, 42.36, 43/42.24, 44.9, 44.91, 44.2, 44.29

[56] References Cited

U.S. PATENT DOCUMENTS

| | | | |
|---|---|---|---|
| 4,167,076 | 9/1979 | Weaver | 43/42.2 |
| 4,244,133 | 1/1981 | Martinek | 43/42.25 |
| 4,827,657 | 5/1989 | Slehofer | 43/42.24 |
| 4,942,689 | 7/1990 | Link et al. | 43/42.24 |
| 5,025,586 | 6/1991 | Pixton | 43/42.39 |
| 5,129,175 | 7/1992 | Pixton | 43/42.39 |
| 5,142,811 | 9/1992 | Freeman | 43/42.24 |
| 5,152,094 | 10/1992 | Strickland | 43/42.39 |

*Primary Examiner*—Mark Rosenbaum
*Assistant Examiner*—Chuck Y. Mah
*Attorney, Agent, or Firm*—William E. Noonan

[57] ABSTRACT

A fishing sinker apparatus is disclosed for a Texas rig-type fishing lure wherein an eyelet portion of a hook at the end of a fishing line is embedded proximate a head of the lure and a pointed portion of the hook is embedded proximate a tail of the lure. The apparatus includes a convexly tapered weight member having a narrow leading portion, a broad trailing portion and an axial opening that extends through the weight from the leading portion to the trailing portion. There is a screw element attached to the trailing portion of the weight member. The screw element includes a central shaft portion that extends axially from the trailing portion and an elongate thread wound about the shaft portion and interengaging the shaft portion for a majority of the length of the thread. An elongate conduit extends axially through the central shaft and into the axial opening of the weight member for slidably receiving the fishing line and anchoring the screw element to the weight member. The screw element has a length and diameter that permit the screw element and the weight member to release from the lure when the eyelet of the hook is pulled against the screw such that the sinker is slidable along the fishing line.

8 Claims, 3 Drawing Sheets

5,490,345

SINKER APPARATUS FOR TEXAS RIG FISHING LURE

FIELD OF THE INVENTION

This invention relates to an improved fishing sinker and, more particularly, to a weighted sinker for a Texas rig-style of the type primarily used in bass fishing.

BACKGROUND OF THE INVENTION

Conventional "Texas rig" fishing lures employ a hook that is embedded in a plastic worm such that the eyelet of the hook is located toward the head and the point of the hook is located toward the tail of the worm. A lead weight sinker is used to assist in casting the hook and lure and dropping these items toward the bottom of the water being fished. The fisherman then attracts the fish by flipping, jigging, reeling in or otherwise moving the line so that the plastic worm simulates the movement of a live worm. Texas rigs employ both slip and fixed sinkers. A slip sinker typically includes a groove or channel that permits it to slide along the line, whereas a fixed sinker is fixedly attached to the lure or line.

Recently, a number of features have been developed to improve the performance of Texas rigs. For example, U.S. Pat. No. 4,649,663 discloses the use of a tubular plastic insert designed to remedy the problem of frayed fishing lines often exhibited by traditional slip sinkers. Additionally, generally bullet shaped fixed sinkers have been developed to reliably carry the lure to the bottom through water filled with debris such as weeds and water lilies. In U.S. Pat. No. 5,025,586 a helical coil spring is attached to the bullet-shaped sinker. This spring allows the sinker weight to be screwed onto the head of the plastic worm. This device also employs the tubular insert described above.

Unfortunately, the preceding implement often hinders proper setting of the hook. The insert and the spring are composed of relatively rigid materials that tend to restrict movement of the eyelet portion of the hook through the lure. As a result, following an apparent strike, when the fisherman pulls on the line to set the hook in the fish, the pointer portion of the hook may be unable to pierce fully through the worm and set in the fish. Moreover, this sinker does not reliably dislodge or release from the worm after a fish strikes. The coil spring is wound a considerable distance (at least 8 turns) into the worm and has a conical shape. As a result, the sinker tends to remain lodged in the worm even after the fish strikes. This may cause the line to which the sinker is attached to break as the fish is reeled in by the fisherman. In addition, because the sinker is effectively fixed, it does not provide nearly as satisfactory a feel as is provided by slip sinkers.

The above disadvantages are largely overcome by the sinker disclosed in U.S. Pat. No. 5,152,094. That device employs a flexible tubular insert that collapses to allow the hook to properly set. Additionally, the sinker effectively releases from the worm after the hook is set. As a result, the improved feel of a slip sinker is provided, while the remaining advantages of the coil spring and tubular insert are maintained. Nonetheless, although this apparatus is the most effective known to date, on occasion it can still exhibit certain disadvantages. In particular, the helical coil spring tends to permanently damage the plastic worm when it pulls out of the worm. This is apparently due to the relatively tight attachment between the worm and the spring. Additionally, the device of Pat. No. 5,152,094 can be relatively intricate and tedious to manufacture.

SUMMARY OF INVENTION

It is therefore an object of this invention to provide an improved fishing sinker apparatus for a Texas rig-type fishing lure that readily and completely releases from the lure after the hook is set, without permanently damaging the lure.

It is a further object of this invention to provide an improved Texas rig fishing sinker that is manufactured relatively simply, quickly and inexpensively.

It is a further object of this invention to provide a fishing sinker apparatus for a Texas rig that permits the fish hook to be effectively and securely set in the fish without hindrance from the sinker apparatus itself.

It is a further object of this invention to provide a fishing sinker apparatus that is effectively and securely fixed to a Texas rig-style lure before the hook is set in a fish and that effectively releases from the lure after the hook is set to provide the favorable feel of a slip sinker.

This invention results from a realization that a slip sinker for a Texas rig will release more readily from the lure without permanently damaging the lure if the sinker is attached to the lure by a solid screw element rather than a helical coil spring element. This occurs because the screw element bites into the worm only along the exterior surface of its threads whereas the coil spring bites into the worm both along the exterior and interior surfaces of the coil.

This invention features a fishing sinker apparatus for a Texas rig-type fishing lure, wherein an eyelet portion of a hook at the end of a fishing line is embedded proximate a head of the lure and a pointed portion of the hook is embedded proximate a tail of the lure. The apparatus includes a convexly tapered weight member having a narrow leading portion, a broad trailing portion and an axial opening that extends through the weight from the leading portion to the trailing portion. A screw element is attached to the trailing end of the weight member and includes a central shaft portion that extends axially from the trailing end and an elongate thread wound about the shaft portion and engaging the shaft portion for most of the length of the thread. There are means defining an elongate conduit that extends axially through the central shaft and into the axial opening of the weight member for slidably receiving the fishing line and anchoring the screw element to the weight member. The screw element has a length and diameter that permit the screw element and the weight member to release from the lure when the eyelet of the hook is pulled against the screw such that the sinker is slidable along the fishing line.

In a preferred embodiment the shaft portion and the thread of the screw element comprise a one piece construction. The screw element is preferably adhesively secured to the trailing portion of the weight member.

The conduit may comprise an elongate, one-piece tube that extends through and is mounted in the axial opening of the weight member and a substantially aligned axial bore in the shaft portion of the screw element. The conduit may include a forward portion that extends within the axial opening of the weight member to at least the leading end thereof. The tubular element may include a rearward portion that extends slightly beyond a distal portion of the shaft portion. Typically, the tubular element is adhesively secured to the axial bore in the shaft and the axial opening in the weight member. Alternatively, the entire conduit and the remaining portion of the screw element may comprise a unitary one-piece construction.

DETAILED DESCRIPTION OF PREFERRED EMBODIMENTS

Other objects, features and advantages will occur from the following description of preferred embodiments and the accompanying drawings, in which.

Figure 2:
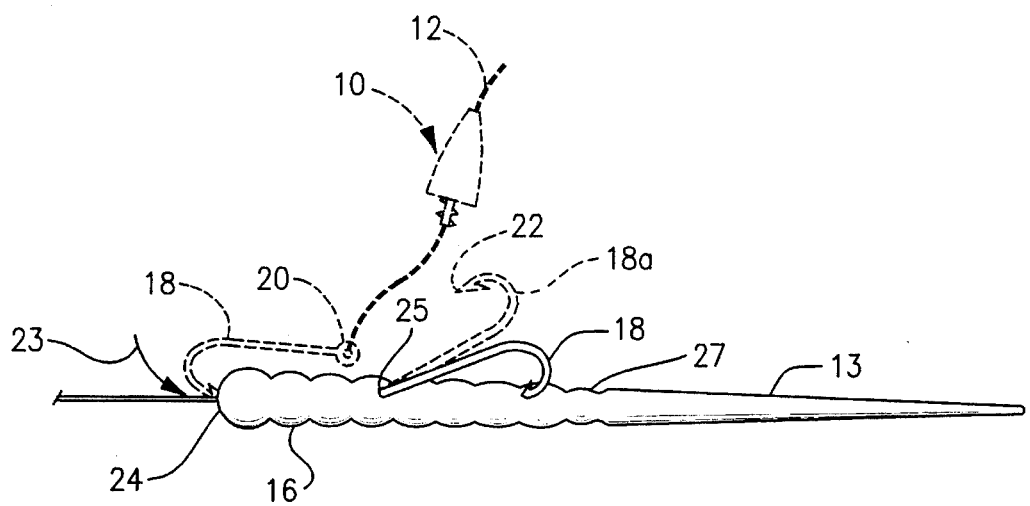
FIG. 2 is an elevational view similar to FIG. 1 that illustrates a preferred manner for setting the Texas rig such that the sinker of this invention may be attached to the lure.

There is shown in FIG. I a sinker apparatus 10 that is slidably mounted on a fishing line 12 and attached to a conventional Texas rig-type lure assembly 14. The Texas rig assembly comprises a rubber or plastic worm 16 through which a fish hook 18 is embedded according to the known "Texas rig" technique. As best shown in FIG. 2, hook 18 includes an eyelet 20 at one end, a barbed point 22 at the opposite end and an intermediate shaft 19. Fishing line 12 is tied or otherwise secured to the hook through eyelet 20 and sinker 10 is slidably mounted along line 12 in a manner described more fully below.

Figure 1:
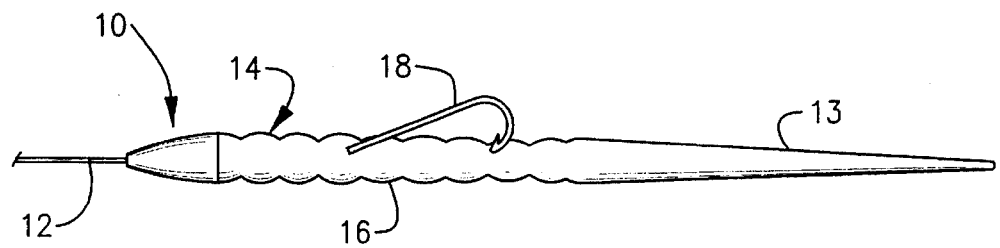
FIG. 1 is an elevational view of a Texas rig-type lure having a sinker apparatus of this invention attached to the head thereof.

To assemble the Texas rig, point 22 of hook 18 is embedded in the direction of arrow 23 into head portion 24 of worm 16. Hook 18 is then manipulated through the body of worm 16 and extended out of the body through an opening 25 created by the point 22 to the position shown by 18a. Point 22 is then embedded in the body portion 27 of worm 16 relatively toward the tail portion 13 of the worm. This protects the point from entangling with underwater plants. In clear open water conditions point 22 may be extended completely through the body of worm 16. In these cases, the remainder of the hook remains fully embedded in the worm and the hook is not exited through an opening 25. In either event, eyelet portion 20 remains embedded within the worm relatively toward head portion 24. After the hook has been secured to the worm in this manner, sinker 10 is drawn along line 12 and provisionally attached to head portion 24, as illustrated in FIG. 1 and described more fully below.

Figure 3:
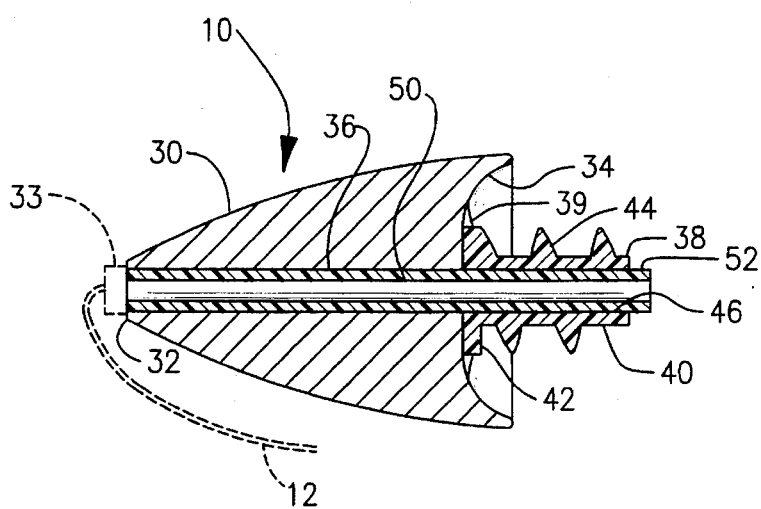
FIG. 3 is an elevational, cross sectional view of a preferred sinker according to this invention.

As best shown in FIG. 3, sinker apparatus 10 includes a convexly shaped weight member 30 having a relatively pointed leading portion 32 and a relatively broad trailing portion 34. Trailing portion 34 includes a relatively shallow recess, although in alternative embodiments the trailing portion may be flat. An axial opening 36 extends through weight member 30 from leading portion 32 to trailing portion 34.

Figure 4:
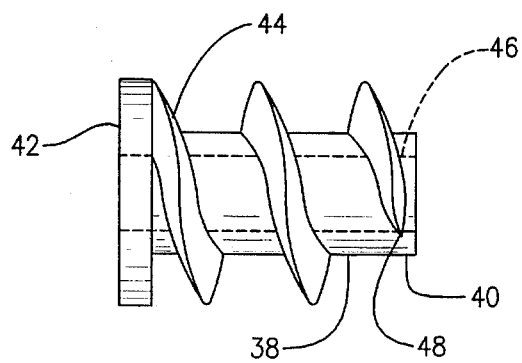
FIG. 4 is an elevational side view of a one-piece screw element according to this invention.

A plastic screw element 38 is mounted to trailing portion 34 of weight member 30 by a suitable waterproof adhesive 39. Screw element 38, shown alone in FIG. 4, includes an elongate cylindrical shaft 40 that extends from an annular base 42. An elongate screw thread 44 extends from base 42 and is wound helically about the outer surface of shaft 40. Thread 44 interengages shaft 40 for almost the entire length of the thread. The inner diameter of the thread remains in constant direct contact with the shaft from the base 42 to a position just short of the distal end portion 48 of thread 44. There are no Saps exhibited between thread 44 and the outer diameter of shaft 40 other than at end portion 48. This is contrasted with the constant gap between the helical coil spring and the tubular element in the prior art. Thread 44 has a generally uniform diameter for most if not all of its entire length. In certain embodiments, distal end 48 may include a pointed or tapered tip that is spaced slightly apart from shaft 40. This enables the thread to better pierce and attach to the lure 14. As stated, this is the only location along the length of the thread where a gap will be exhibited between the thread and the shaft.

Screw element 38 also includes an axial bore 46 that extends through base 42 and the entire length of shaft 40. As a result, the shaft defines a cylindrical element. The base, shaft and exterior thread preferably comprise a single piece of plastic, which may be cast or molded using various known techniques.

Referring to FIG. 3, waterproof adhesive 39 is disposed about base 42 of screw element 38. Shaft 40 and exterior thread 44 extend axially from trailing portion 34 of weight member 30. From base 42, thread 44 is wound approximately 2-4 turns about shaft 40 such that the thread extends not greater than about ¼ from trailing portion 34. Shaft 40 extends slightly beyond the distal end of thread 44.

Axial bore 46 through screw element 38 is substantially aligned with axial opening 36 in weight member 30. A plastic tubular conduit 50 is insertably mounted within axial opening 36 and aligned bore 46. The conduit has a very close tolerance fit within both the axial opening and the axial bore. Conduit 50 includes various types of materials such as the pliable plastic tubing or sheaths that are employed in electrical wiring applications. Conduit 50 extends to leading portion 32 of weight member 30. In alternative embodiments, conduit 50 may extend slightly beyond leading end 32, as indicated by extended portion 33, shown in phantom. The tubular conduit is secured within axial opening 36 and axial bore 46 by a suitable waterproof adhesive. Conduit 50 slidably accommodates the fishing line 12 and serves to securely anchor screw element 38 to weight member 30. It is important that the conduit extend all the way to the leading end 32 of weight member 30. Otherwise, mounting adhesive that is applied to the outer circumference of conduit 50 will tend to leak over the outer end of the conduit and plug the passageway through the conduit. It is further suspected that the conduit helps to protect line 12 against fraying and damage from the edges of weight member 30.

Conduit 50 is preferably dyed, painted or otherwise provided with a surface coloring that is attractive to fish. Red is a preferred color for the conduit.

Sinker 10 is typically constructed by first forming opening 36 through weight member 30. One end of tubular conduit 50 is introduced a short distance into opening 36 through trailing portion 34 and a fast drying waterproof adhesive is deposited on the exterior surface of conduit 50 proximate the entrance of opening 36. The conduit is then inserted fully into opening 36 to the position shown in FIG. 3. This draws the adhesive into the opening where it quickly dries to secure the tubular conduit in place. Screw element 38 is then engaged with the rearward end of conduit 50 such that the tubular conduit is inserted through bore 46 of screw element 38. The base 42 of the screw element is engaged with trailing portion 34 and secured thereto by adhesive 39. Before screw element 38 is engaged with conduit 50, additional waterproof adhesive is spread over the outer diameter of that portion of conduit 50 which extends rearwardly from trailing portion 34. After the screw element is engaged with the conduit, this adhesive dries to further secure the screw element to the weight member. A short section 52 of conduit 50 extends rearwardly from the distal end of screw element 38.

Figure 5:
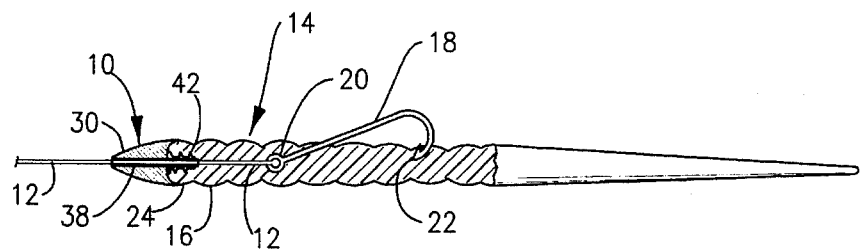
FIG. 5 is an elevational, partly cross sectional view of a Texas rig equipped with the sinker of this invention.

Sinker 10 is provisionally attached to plastic worm 16 in the manner shown in FIG. 5. In particular, screw element 38 is screwed into head portion 24 of worm 16 so that weight member 30 is attached and trailing portion 34 engages the head of the worm. That portion of tubular conduit 50 that is surrounded by screw element 38 likewise extends into the head portion 24 of worm 16. Fishing line 12, which extends through conduit 50, is attached to eyelet portion 20 of embedded hook 18 in the manner previously described.

In the condition shown in FIGS. 1 and 5, the lure assembly 14 and the attached sinker 10 are cast by the fisherman. The sinker causes lure assembly 14 to descend reliably to the bottom of the bottom of water being fished. The fisherman then jigs the assembly 14 in a conventional manner so that fish are attracted.

Figure 6:
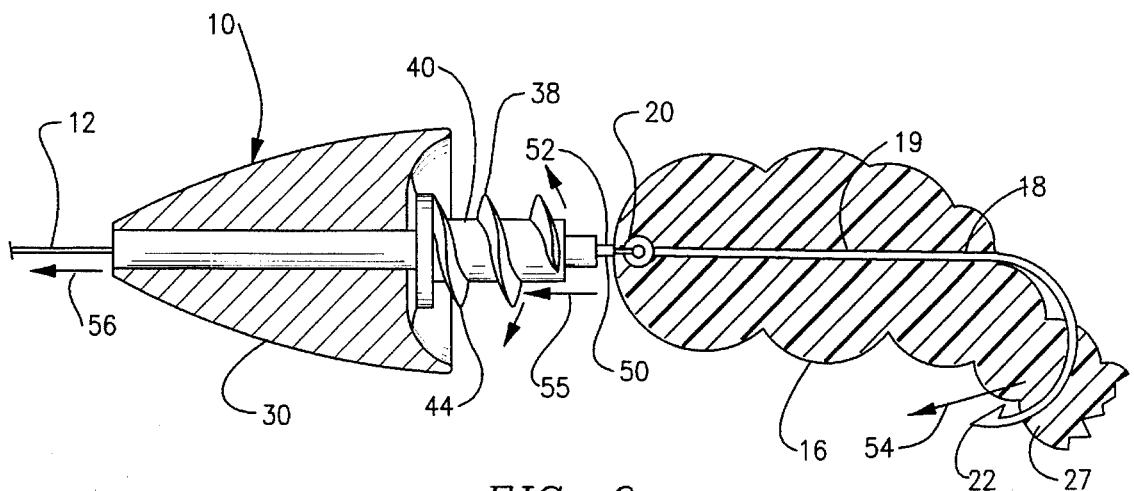
FIG. 6 is an enlarged elevational view, partly in cross section and partly cut away that illustrates the hook being set to release the sinker apparatus from the lure.

When the fisherman senses that a fish has struck the lure, he takes up the slack in line 12 and then jerks the line to set hook 18 in the fish. As shown in FIG. 6, when line 12 is jerked in the direction of arrow 50, eyelet 20 of hook 18 is pulled against the distal segment 52 of conduit 50 and the distal end of screw 38. Hook 18 moves through worm 16 so that point portion 22 is pulled in the manner indicated by arrow 54 completely through the body portion of the worm. As a result, point 22 is able to pierce and engage the fish so that the fish hook is properly set in the fish. As hook 18 is pulled against tubular conduit 50 and screw element 38 in the direction of arrow 55, a force is applied in that direction to weight member 30. Because of the relatively short length of screw element 38, this force causes the entire sinker apparatus 10 to dislodge from head portion 24 of worm 16. The sinker apparatus is able to release much more easily from the head of worm 16 because of the configuration of screw thread 44. For the majority of its length, thread 44 interengages screw shaft 40. Because there is no gap between the thread and shaft for most of the length of the thread, when the screw element is initially engaged with the head of the worm, the plastic or rubber worm material is formed primarily about only the exterior surface of the thread 44. This contrasts with the open helical spring used in the prior art wherein plastic or rubber is formed both over the exterior and through the axial interior of the spring. Unlike the open helical coil spring of the prior art, screw element 38 employs a generally solid thread with no interior axial opening that engages the plastic of the worm. As a result, the sinker 10 is gripped by lure 16 less tightly and releases the lure much more easily and reliably when engaged by hook 18 than do the sinkers which employ coil springs for attachment to the lure. Release of sinker apparatus 10 is also facilitated because screw element 38 has a generally cylindrical shape and a uniform diameter, unlike the conical shape employed by some known helical springs.

The looser grip provided by the screw element of this invention and its relatively easy release also means that significantly less damage is caused to the lure when the sinker is released from the lure. In the prior art, the overly tight grip between the screw element and the worm causes significant damage to the worm when the sinker is released. In most cases, the worm is permanently destroyed. In the present invention, however, the screw element is securely, yet relatively loosely attached to the worm and releases quite easily. In most cases, sinker 10 can be reattached to the head of lure 16 and the entire assembly reused. This results in significant monetary savings for the fisherman.

Figure 7:
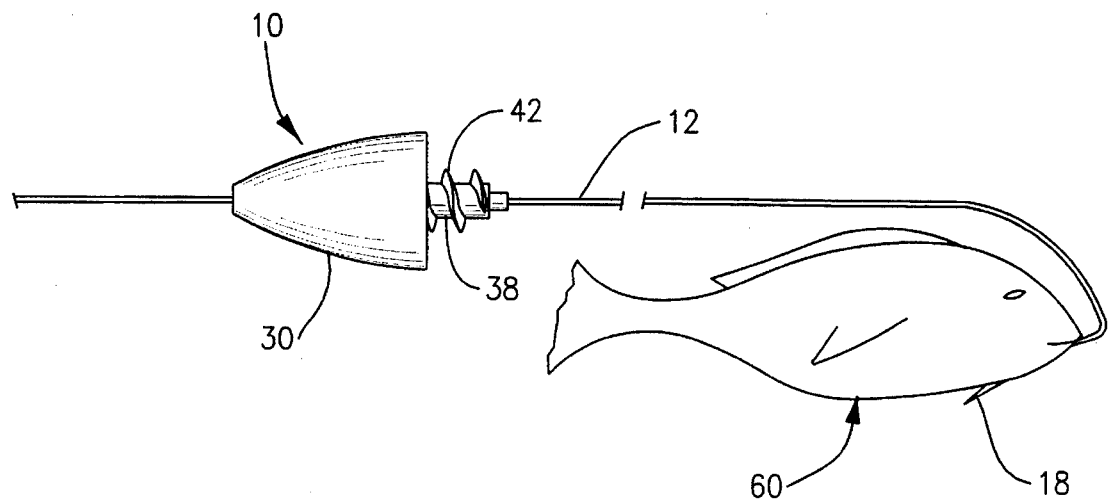
FIG. 7 is an elevational view of the sinker after the hook has been set in a fish that has struck the lure and the sinker has been released and converted to a slip sinker.

As shown in FIG. 7, upon setting of hook 18, apparatus 10 releases to become a slip sinker, which slides along fishing line 12. Hook 18 remains set in fish 60. However, sinker apparatus 10 is disengaged from the lure assembly. As a result, line 12 is less likely to break from the force exerted on it as the fisherman fights and reels in the hooked fish. Additionally, the user is employed with an improved feel, which facilitates landing the fish that has been hooked.

Figure 8:
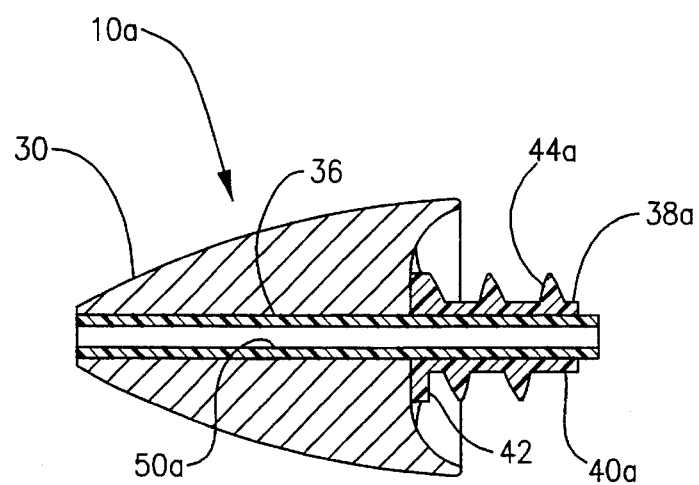
FIG. 8 is an elevational, cross sectional view of an alternative preferred sinker according to this invention.

FIG. 8 illustrates an alternative screw element 38a wherein the shaft portion 40a and the tubular conduit 50a are unitarily connected. This product is manufactured by, for example, an appropriate molding process. Otherwise, the remaining, parts of screw element 38a are identical and operate analogously to those previously described. In particular, base 42a engages and is fixedly secured to the trailing portion of weight member 30. Waterproof adhesive is also applied to that portion of conduit 58 that extends through axial opening 36 of weight member 30. The thread 44a is constructed and operates to attach the sinker 10a to a lure in the manner described above.

Accordingly, the present invention permits a bullet shaped slip sinker to be released from a Texas rig lure much more effectively and reliably than has heretofore been possible. The invention also permits repeated use of conventional plastic worms. This is accomplished because the invention employs a unique screw element employing a solid thread that does not bite as tightly into the lure as does the coil spring attachment of the prior art.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A fishing sinker apparatus for a Texas rig-type fishing lure, wherein an eyelet portion of a hook at the end of a fishing line is embedded proximate a head of the lure and a pointed portion of the hook is embedded proximate a tail of the lure, said apparatus comprising:

a convexly tapered weight member having a narrow leading portion, a broad trailing portion and an axial opening that extends through said weight from said leading portion to said trailing portion;

a screw element attached to said trailing portion of said weight member and including a central shaft portion that extends axially from said trailing portion and an elongate thread wound about said shaft portion and interengaging said shaft portion for a majority of the length of said thread; and means defining an elongate conduit that extends axially through said central shaft and into said axial opening of said weight member for slidably receiving said fishing line and anchoring said screw element to said weight member, said screw element having a length and diameter that permit said screw member and said weight member to release from said lure when said eyelet of said hook is pulled against said screw such that said sinker is slidable along said fishing line.

2. The apparatus of claim 1 in which said shaft portion and said thread comprise a one-piece construction.

3. The apparatus of claim 1 in which said screw element is adhesively secured to said trailing portion of said weight member.

4. The apparatus of claim 1 in which said means defining an elongate conduit comprise an elongate, one piece tube that extends through and is mounted in said axial opening of said weight member and a substantially aligned bore in said shaft portion of said screw element.

5. The apparatus of claim 4 in which said tube includes a rearward portion that extends slightly beyond a distal end of said shaft portion.

6. The apparatus of claim 4 in which said tube is adhesively secured to said screw element and said weight member.

7. The apparatus of claim 1 in which said conduit includes a forward portion that extends within said axial opening of said weight member to at least said leading end thereof.

8. The apparatus of claim 1 in which said conduit and said screw element comprise a unitary one-piece construction.

* * * * *